(No Model.) 3 Sheets—Sheet 2.
M. G. BUNNELL.
WHEELED SCRAPER.
No. 598,281. Patented Feb. 1, 1898.
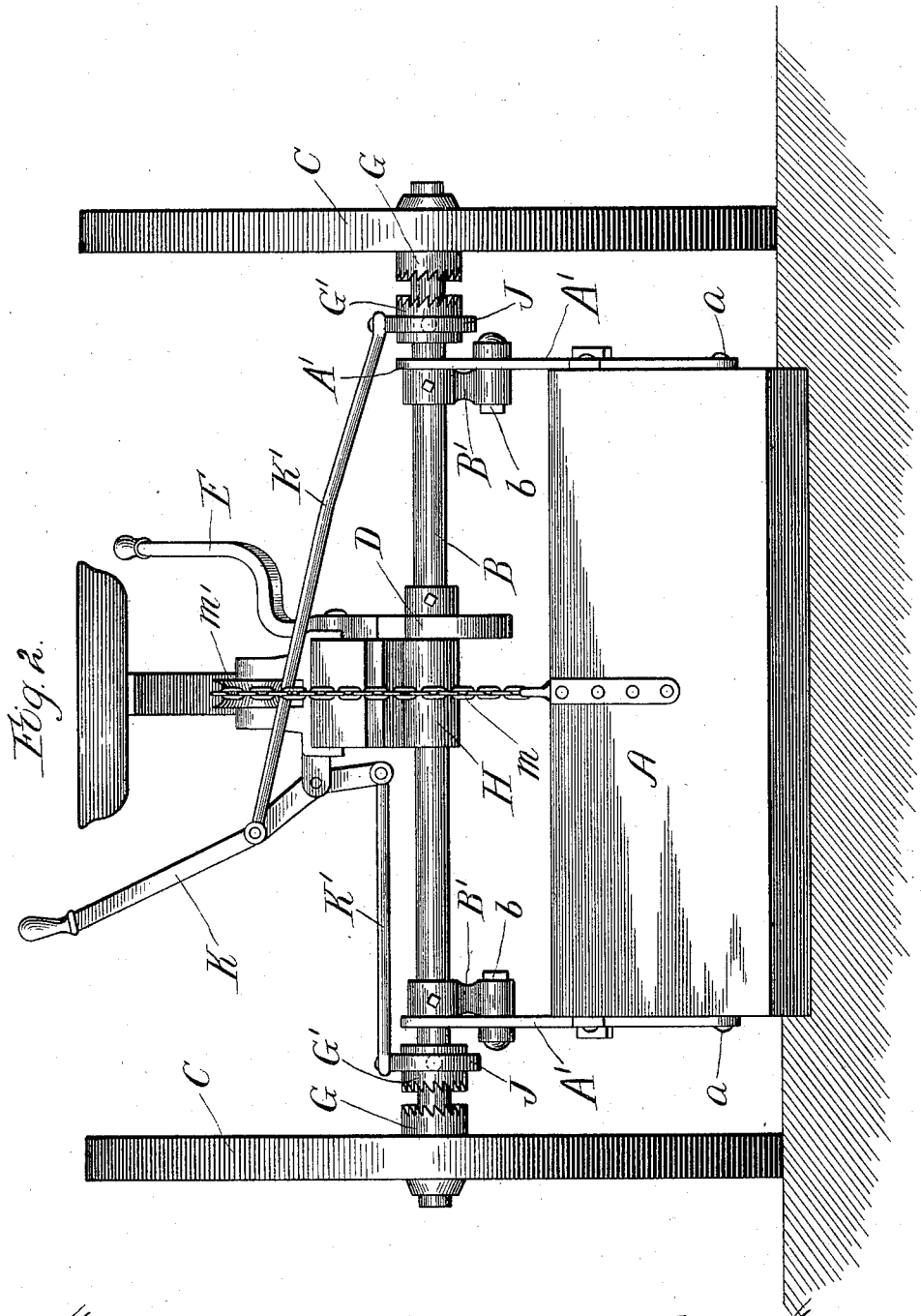
Witnesses:
A. F. Durand.
A. M. Belfield
Inventor
Morton G. Bunnell
by Page & Belfield
Attys

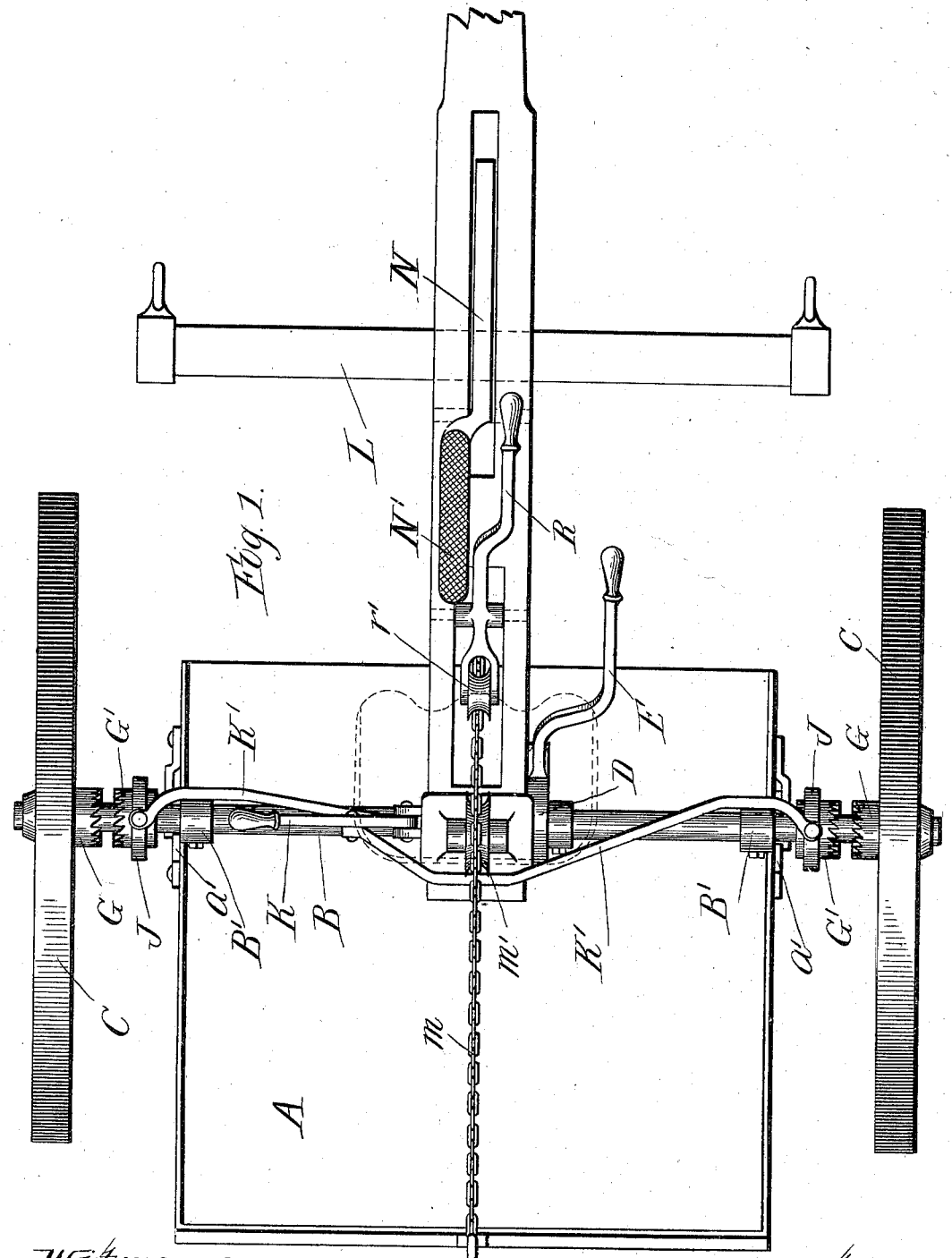

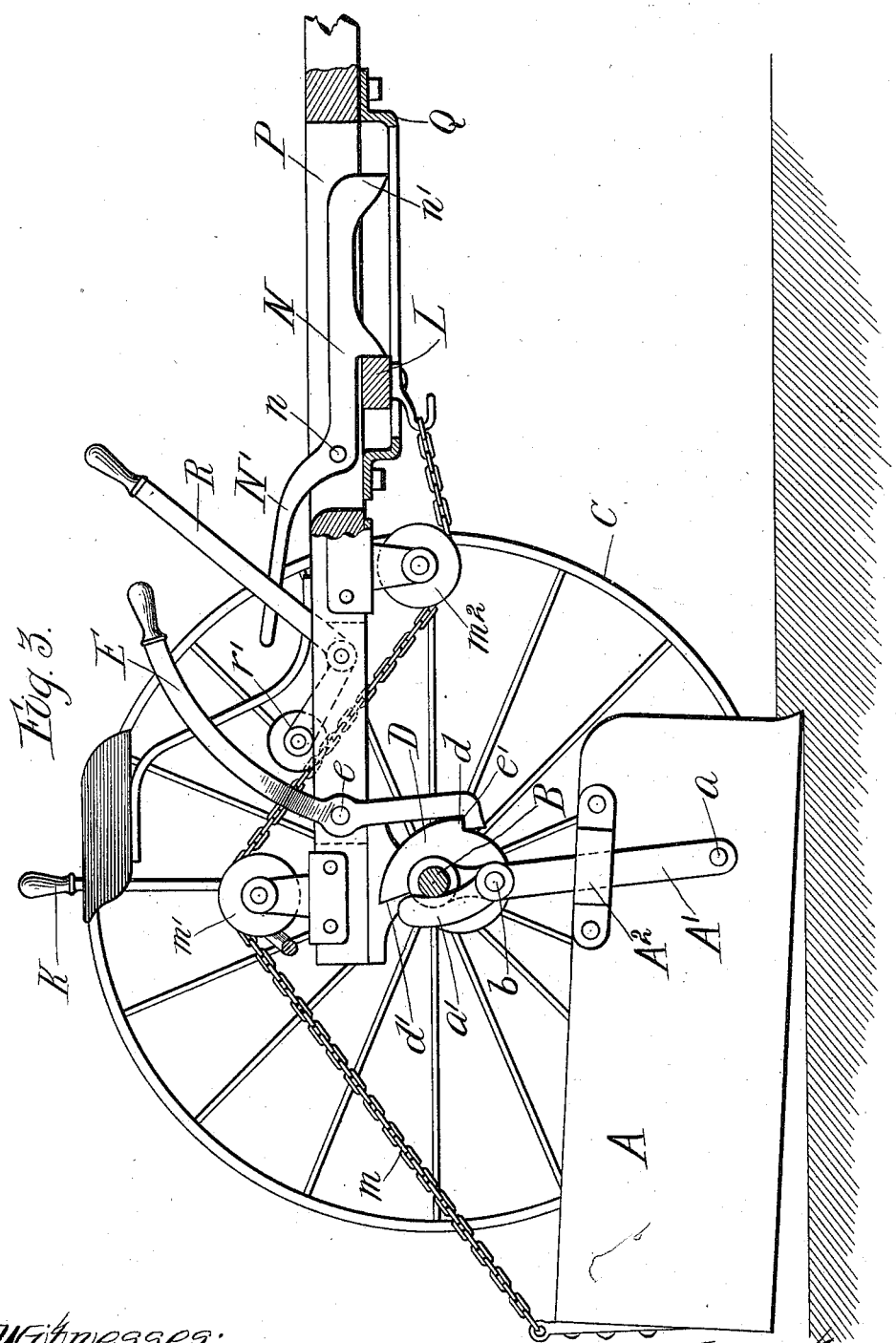

UNITED STATES PATENT OFFICE.

MORTON G. BUNNELL, OF CHICAGO, ILLINOIS, ASSIGNOR TO FREDERICK C. AUSTIN, OF SAME PLACE.

WHEELED SCRAPER.

SPECIFICATION forming part of Letters Patent No. 598,281, dated February 1, 1898.

Application filed September 11, 1896. Serial No. 605,465. (No model.)

*To all whom it may concern:*

Be it known that I, MORTON G. BUNNELL, a citizen of the United States, residing at Chicago, in the county of Cook and State of Illinois, have invented a new and useful Improvement in Wheeled Dumping-Scrapers, of which the following is a specification.

My invention relates to a construction of wheeled dumping-scraper in which provision is made for utilizing the draft of the team as a means for raising the loaded scoop from the ground.

In a machine characterized by my invention means are provided whereby the driver while occupying a conveniently-arranged seat can rock or vibrate the scoop at a time when the forward end of the same is about to enter the ground, so as to assist the forward edge of the scoop in penetrating the soil, the motion of the scoop being similar to a motion which is commonly given a spade in digging. The scoop is suspended from the axle, which is normally locked against rotation, but which can be placed in clutch with the wheels by a clutch mechanism when it is desired to turn the axle for the purpose of raising the loaded scoop. When the loaded scoop has been raised to a suitable height, the axle can be unclutched and again locked, and when it is desired to dump the load the draft of the team can also be employed for such purpose. The entire machine can easily be controlled by one attendant, who will occupy a driver's seat and utilize the draft of the machine as a means for both raising the loaded scoop and for dumping the same, as hereinafter more fully described.

Prominent objects and advantages sought and attained are the utilization of the team in the manner aforesaid, a saving in labor and reduction in the number of attendants, ready and effective penetration into the soil, and the provision of simple, convenient, and practical devices serving to generally increase the efficiency of wheeled dumping-scrapers and admit of their being easily and economically operated.

In the accompanying drawings, Figure 1 is a top plan view of a wheeled dumping-scraper embodying the principles of my invention. Fig. 2 is an elevation of the rear end of the same. Fig. 3 is a vertical section taken longitudinally and centrally through the same.

The scoop A is suspended from the axle B, which latter is in turn supported by the wheels C C. The axle B is free to rotate in the journal H, but is normally locked against rotation, it being observed that in such case the wheels C C turn independently with respect to the axle B. The axle B can, however, be unlocked and placed in clutch with the wheels by means of suitable clutch mechanism. As a convenient arrangement for locking and unlocking the axle and for causing the same to turn with the wheels the axle is provided with the cam D, Fig. 3, having an engaging face $d$, and the lever E is pivotally connected to the frame of the machine, as at $e$, and is provided with the face $e'$, which is adapted to engage the face $d$ on the cam D. The cam D is also provided with a second face $d'$, which may engage the end of the lever E after the axle has been suitably turned. The axle B is also provided with the clutch members $G'$ $G'$, which are arranged to engage corresponding members G G on the hubs of the wheels C C.

The clutch members $G'$ $G'$ on the axle B are constructed to turn with the latter, but are capable of movement along the length of the same. To such end the collars J J are fitted over the members $G'$ $G'$, so as to permit the rotation of the latter within them, and the collars J J are connected to the lever K by the rods $K'$ $K'$, Fig. 2, whereby both clutches may be readily thrown into engagement at the same time. By such arrangement the axle B is normally locked against rotation by the engagement of the cam D and the lever E; but it can be unlocked by a movement of the lever E, at which time the lever K can be operated to throw the wheels into clutch with the axle for the purpose of raising the scoop.

The scoop A is suspended from the axle B and is connected with the same at points eccentric to the center of the axle, whereby the rotation of the latter will lift the scoop. As a convenient arrangement the axle is provided with a couple of arms $B'$ $B'$, which are secured rigidly thereto at points above the sides of the scoop, and the links or rods $A'$ $A'$ are pivotally connected with ends of the arms B' B' and with the sides of the scoop, as at the points a. The straps A² A² are desirably secured to the sides of the scoop over the suspending-links A' A' to limit the play of the latter.

Obviously when the axle B is unlocked and thrown into clutch with the wheels C C the arms B' B' will swing rearwardly and upwardly and lift the scoop from the ground. The scoop may be retained in such elevated position by unclutching the axle and permitting the lever E to engage the face d of the cam D. The scoop is also braced to prevent the resistance of the earth from giving an undesirable backward movement. Such result may be attained by causing the suspending-links A' A' to bear against the axle B at such points that the backward thrust of the scoop will be met by the resistance of the axle. As a preferred arrangement the links or rods A' A' are provided with the extensions a' a', which are constructed to extend to the rear of the axle and to bear against the same and thus prevent a rearward movement of the scoop, it being observed that to accomplish this result the points of connection b b of the arms B' B' and the suspending-links A' A' are held stationary by the locked condition of the axle B. The scoop is also arranged to permit of its being dumped by the draft of the team. For such purpose I have shown the draft-bar L of the machine constructed so as to be capable of a backward and forward sliding motion and the rear end of the scoop connected with the sliding draft-bar by means of the chain M, which passes over the intermediate wheels $m'$ and $m^2$. The draft-bar L is normally locked by the catch N, which is pivotally connected to the tongue of the machine at n and has an extension N', arranged to serve as a foot-treadle. A downward movement of the treadle N' causes the release of the draft-bar L, which latter may then be drawn forward by the team in the guideway formed by the tongue P and the strap Q, secured to the lower side thereof, thereby elevating the rear end of the scoop and causing it to dump. The catch N is also provided with a shoulder $n'$ at its forward end, whereby the draft-bar may be maintained in a forward position, if desired.

As a means of rocking or vibrating the scoop to assist the forward edge of the same in penetrating the ground the lever R is provided. This lever is pivotally connected to the tongue P at r and is provided with a wheel $r'$ at its free end. The wheel $r'$ may be moved backward and forward to flex the chain M, thereby forming a vibrator which causes the desired rocking or vibrating motion of the forward edge of the scoop.

A machine constructed in accordance with my invention will obviously possess many advantages.

While the scoop is collecting the earth, it may be rocked or vibrated by the lever R to give it a motion similar to that given a spade in digging. When the scoop is sufficiently full, it may be lifted from the ground by unlocking the axle and throwing the same into clutch with the wheels by the levers E and K. The scoop may then be locked in this elevated position, the wheels thrown out of clutch, and the machine moved to any suitable dumping-ground. Here the draft-bar L is released by the treadle N', thereby permitting the forward movement of the team to elevate the rear end of the scoop and dump it.

The various levers are arranged near the seat and within easy reach of the driver. Hence a single attendant may perform all the duties incident to the operation of the machine, and thereby effect a considerable saving of labor.

The devices employed are simple and efficient, and the machine, as a result, is light, durable, and strong.

What I claim is—

1. In a wheeled scraper, the combination with the rotatable axle having a crank portion or portions and provided with means for locking it against rotation and also with means for connecting it so as to turn with the wheels, of the scoop suspended below the axle by means of links or rods which are pivotally connected to said crank portion or portions, and are provided with bearing portions which extend upwardly from said points of connection to the rear of the axle, as set forth.

2. In a wheeled scraper, the combination with the cranked rotatable axle provided with means for locking it against rotation, and with means for connecting it with the wheels, of the scoop suspended below the axle by means of links or rods pivotally connected with said crank portions and provided with upwardly-extending bearing portions arranged to the rear of the axle; and a sliding draft-bar provided with locking means and connected with the rear of the scoop so as to dump the same by its sliding movement, as set forth.

3. In a wheeled dumping-scraper, the combination of the scoop supported for bodily up-and-down movement, whereby it can be alternately placed in loading and carrying positions, and suspended for rocking or tilting motion so as to assist its cutting edge in penetrating the soil; mechanism for thus raising and lowering the scoop; a flexible connector attached to the machine and to the scoop and arranged to cause such rocking or tilting motion on the part of the same when flexed; and means arranged for flexing the flexible connector when the scoop is in loading position, and adapted for operation independently of the raising and lowering mechanism so as to permit the scoop to be rocked or tilted without raising its cutting edge from the soil, as set forth.

4. In a wheeled dumping-scraper, the combination of the scoop suspended so as to permit of its being either dumped or rocked or tilted so as to assist its cutting edge in penetrating the soil; a flexible connector attached to the scoop and arranged so that it can either be flexed so as to cause such rocking or tilting motion on the part of the latter, or be pulled to an extent to cause the same to dump; and means arranged for flexing the flexible connector and adapted to permit the same to be independently pulled, as set forth.

5. In a wheeled dumping-scraper, the combination of the scoop supported for bodily up-and-down movement, whereby it can be alternately placed in loading and carrying positions, and suspended so as to permit of its being dumped when either raised or lowered, and also so as to permit of its being rocked or tilted so as to assist its cutting edge in penetrating the soil when in loading position; a flexible connector attached to the scoop and arranged so that it can either be flexed so as to cause such rocking or tilting motion on the part of the latter, or be pulled to an extent to cause the same to dump; and means arranged for flexing the flexible connector and adapted to permit the same to be independently pulled, as set forth.

6. In a wheeled scraper, the combination with the scoop pivotally supported at its forward end; of a flexible connector having its ends attached respectively to the machine and to the rear end of the scoop; and a lever arranged to have its free end applied to said connector between the points of attachment thereof, as set forth.

7. In a wheeled scraper, the combination with the rotatable axle of the cam D having the oppositely-directioned locking-faces $d$ and $d'$, and the pivoted lever E provided with a projecting portion having opposite faces adapted to engage the faces $d$, $d'$ respectively of the cam D, as set forth.

8. In a wheeled scraper, the scoop suspended below the axle and supported by links or rods, said links or rods being connected to the machine at points below the axle, and provided with extensions which extend to the rear of the axle, and are arranged to bear against the same, as set forth.

9. In a wheeled scraper, the scoop suspended below the axle and supported by links or rods, said links or rods being connected to arms with which the axle is provided, and being provided with extensions which extend to the rear of the axle and which are arranged to bear against the latter, substantially as described.

10. In a wheeled scraper, the rotatable axle provided with means for normally locking the same against rotation, and also with means for connecting it to rotate with the wheels; the scoop suspended below the axle and having its forward end connected therewith at points eccentric to the center of the axle, and its rear end supported by a flexible connector; and a sliding draft-bar to which the connector is attached, said draft-bar being provided with means for normally locking it against sliding movement, as set forth.

11. In a wheeled scraper, the rotatable axle provided with means for normally locking it against rotation, and also with means for connecting it to rotate with the wheels; the scoop suspended below the axle and having its forward end connected to the axle at points eccentric to the center of the latter, and its rear end supported by a flexible connector; a sliding draft-bar to which the connector is attached, said draft-bar being provided with normally-locking means; and means for flexing the connector to cause a rocking motion of the scoop, substantially as described.

12. In a wheeled scraper, the normally-locked rotatable axle, provided with unlocking means, and with means for causing it to rotate with the wheels; the scoop suspended below the axle and having its forward end supported by links or rods, and its rear end by a flexible connector, said links or rods being connected with the axle at points eccentric thereto, and being arranged to bear against the axle to prevent a backward thrust of the scoop; a sliding draft-bar to which the connector is attached, said draft-bar being provided with normally-locking means; and a lever arranged to flex the connector to cause a rocking motion of the scoop, substantially as described.

MORTON G. BUNNELL.

Witnesses:
A. F. DURAND,
A. MILLER BELFIELD.